United States Patent [19]
Alexander

[11] Patent Number: 6,124,783
[45] Date of Patent: Sep. 26, 2000

[54] ANTI-THEFT DEVICE USING THE FRONT WINDSHIELD

[76] Inventor: Jerry D. Alexander, 1497 Estill, Memphis, Tenn. 38109

[21] Appl. No.: 09/231,875

[22] Filed: Jan. 14, 1999

Related U.S. Application Data
[60] Provisional application No. 60/076,034, Feb. 26, 1998.

[51] Int. Cl.[7] .................................................. B60R 25/10
[52] U.S. Cl. ........................ 340/426; 340/425.5; 340/539; 340/471
[58] Field of Search .................................. 340/426, 479, 340/425.5, 468, 470, 471, 472, 539, 461, 438, 980, 434

[56] References Cited

U.S. PATENT DOCUMENTS

| | | | |
|---|---|---|---|
| 2,854,650 | 9/1958 | Baker et al. | 340/479 |
| 4,768,027 | 8/1988 | Benjamin et al. | 340/426 |
| 4,868,542 | 9/1989 | Thompson | 340/49 |
| 4,928,084 | 5/1990 | Reiser | 340/479 |
| 5,604,480 | 2/1997 | Lamparter | 340/470 |
| 5,745,033 | 4/1998 | Jenkins et al. | 340/425.5 |
| 5,905,434 | 5/1999 | Steffan et al. | 340/479 |

Primary Examiner—Daniel J. Wu
Assistant Examiner—Anh La

[57] ABSTRACT

An automobile visible theft device 13 and 14 located inside 1A and 1B which will be operated by 3m's privacy film 5, LSI 8A and lumilux 1B to illuminate the word "STOLEN" 13. This device 1A and 1B will also be operated by a wireless remote control 10 to activate the word "CAR-JACK" 14.

1 Claim, 13 Drawing Sheets

ANTI-THEFT DEVICE USING THE FRONT WINDSHIELD

This case claims priority to provisional application 60/076,034 filed Feb. 26, 1998.

FIELD OF THE INVENTION

This invention is visible to the human's eye and prevents the assailant from seeing device on the outside of the automobile.

BACKGROUND OF THE INVENTION

There are several different types of automobile alarms. Some devices are normally activated by breaking out windows, opening doors, using clothes hangers, slimjims and other devices to steal cars. Today criminals are carjacking killing their victims and sometimes taking the victims children not knowing the child is still in the car.

SUMMARY OF THE INVENTION

This Anti-Theft Device is a two part device working on the same base to prevent theft of an automobile. Located in the front windshield glass of an automobile and a built in license plate frame device, manufactured along with the automobile. The words "STOLEN or CARJACK" will illuminate on the front windshield and license plate frame device when improper entry has occurred. For example, when a car has been started with the key the front windshield and license plate frame device will have no trace of the words stolen or carjack. On the other hand when a car is broken into and started by forced entry the word "STOLEN" will be shown on the front windshield and license plate frame as long as the car is running. The device is made up of 3m's privacy film, LSI, lumilux and illuminated film, with an on and off wireless remote control to be used in case of a carjacking. Once the assailant has driven off with the car, the victim can activate the remote and the word "CARJACK" will immediately appear on the automobile windshield and license plate frame device. This will be helpful in alerting the police that that car has been stolen or carjack and could warn both pedestrians and other vehicles to alert proper authorities to quickly evaluate the situation.

DESCRIPTION OF THE PREFERRED EMBODIMENT

Figure 1:
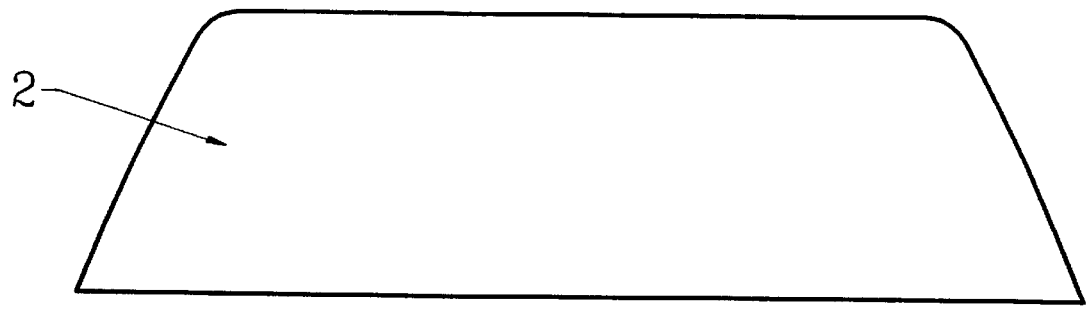
FIG. 1. Displays two pieces of inner and outer layers of glass for automobiles.
Figure 1:
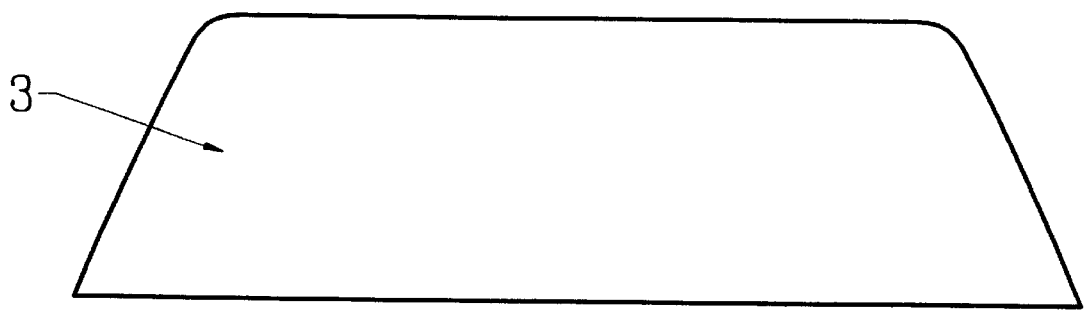
Figure 2:
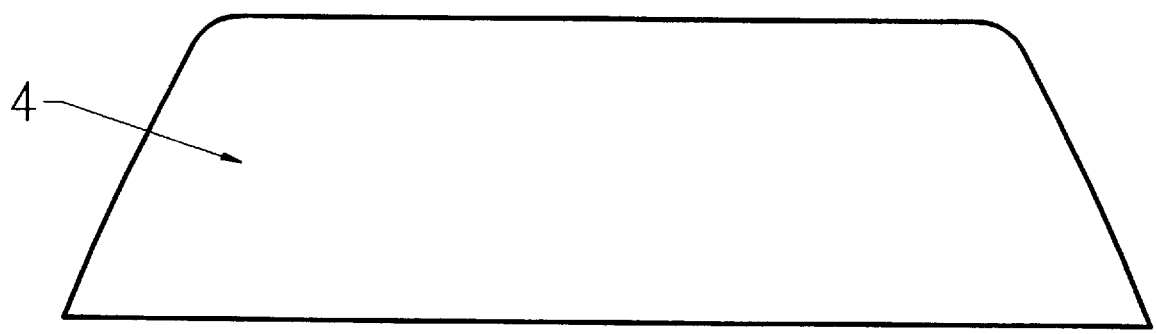
FIG. 2. Shows illuminated film and 3m's privacy film between {FIG. 1}.
Figure 2:
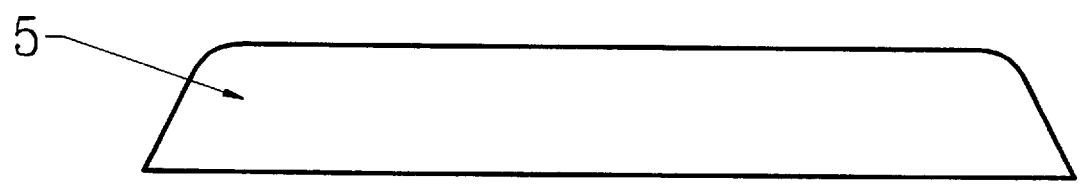
Figure 3:
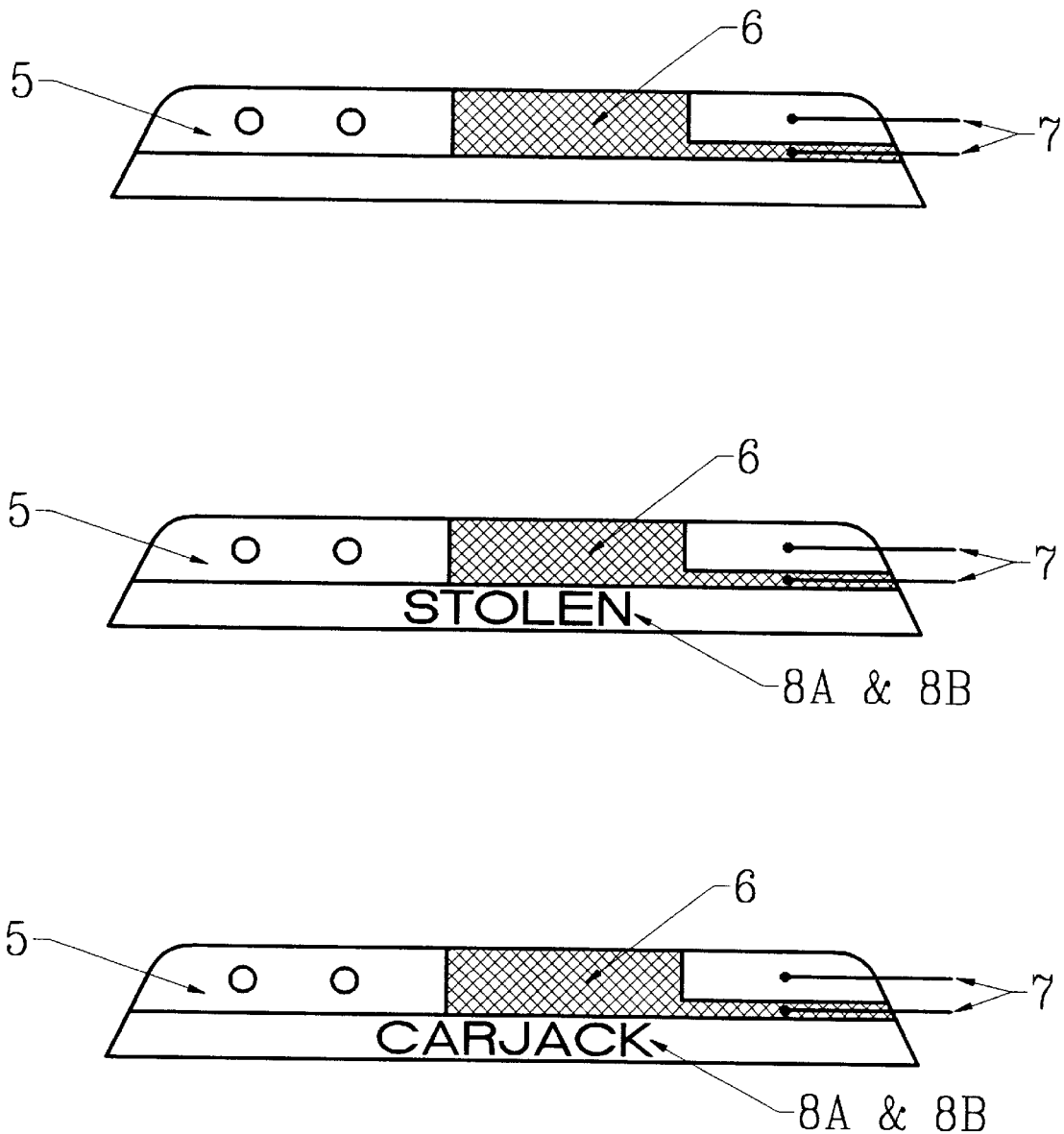
FIG. 3. Shows 3m's privacy film with connecting wires, magnetic field and LSI.
Figure 4:
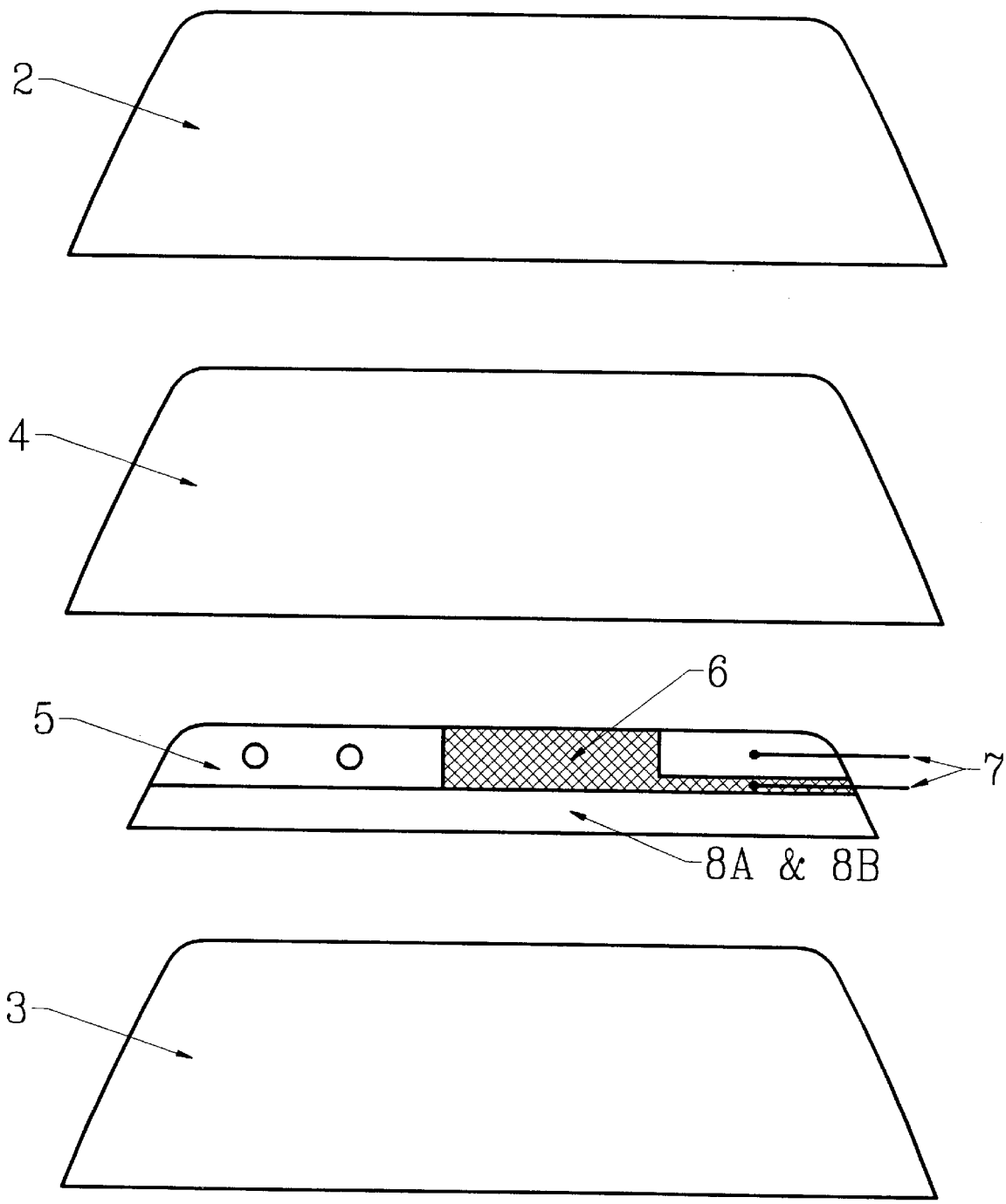
FIG. 4. Shows display 2,3,4,5,6,7 and 8A for device.
Figure 5:
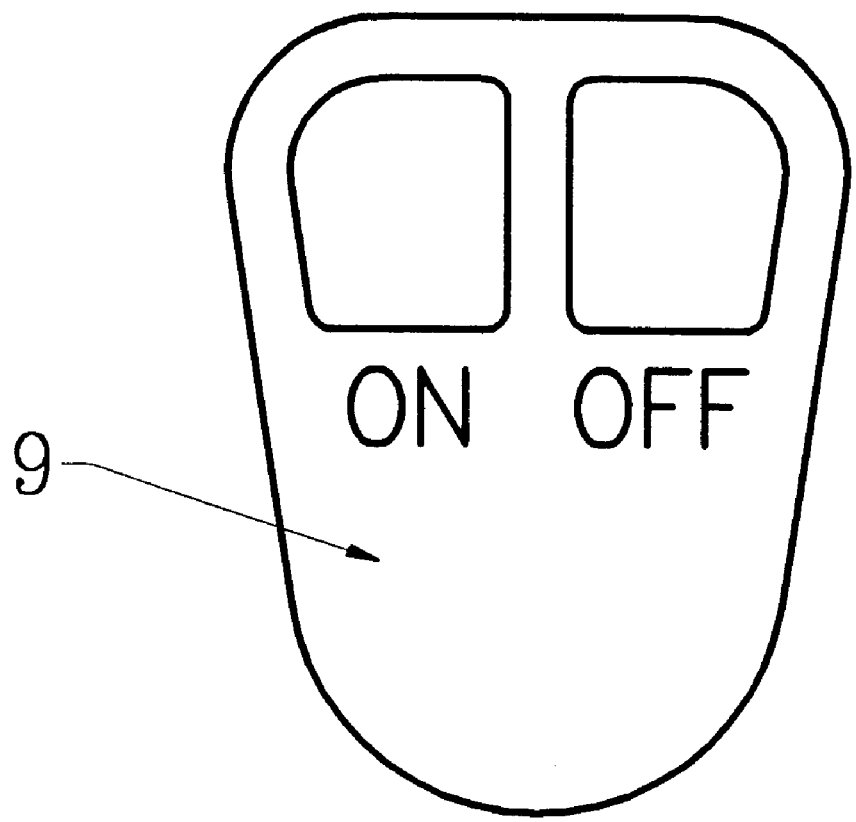
FIG. 5. Displays the wireless remote control in case of a carjack.
Figure 6:
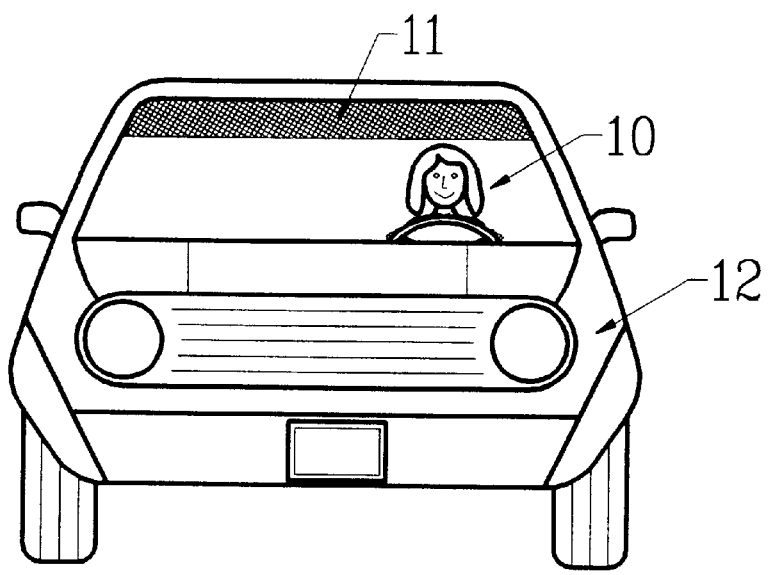
FIG. 6. Displays before and after the effects in case a car is "STOLEN".
Figure 6:
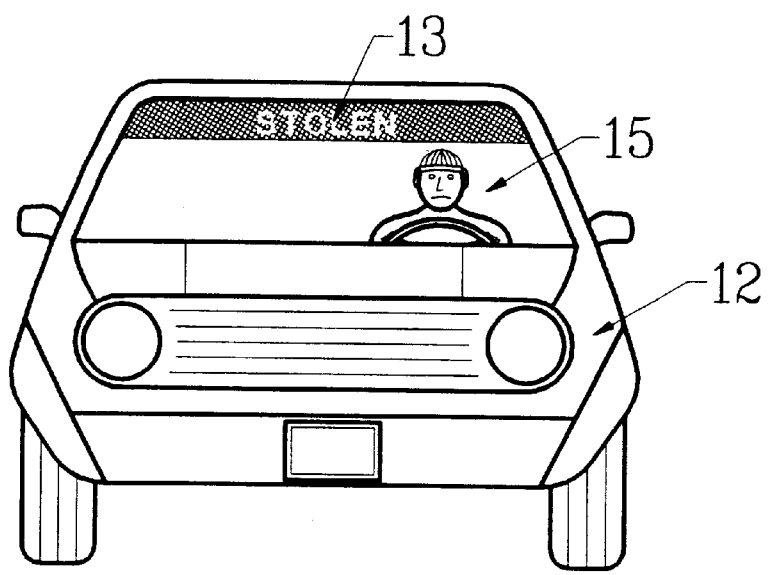
Figure 7:
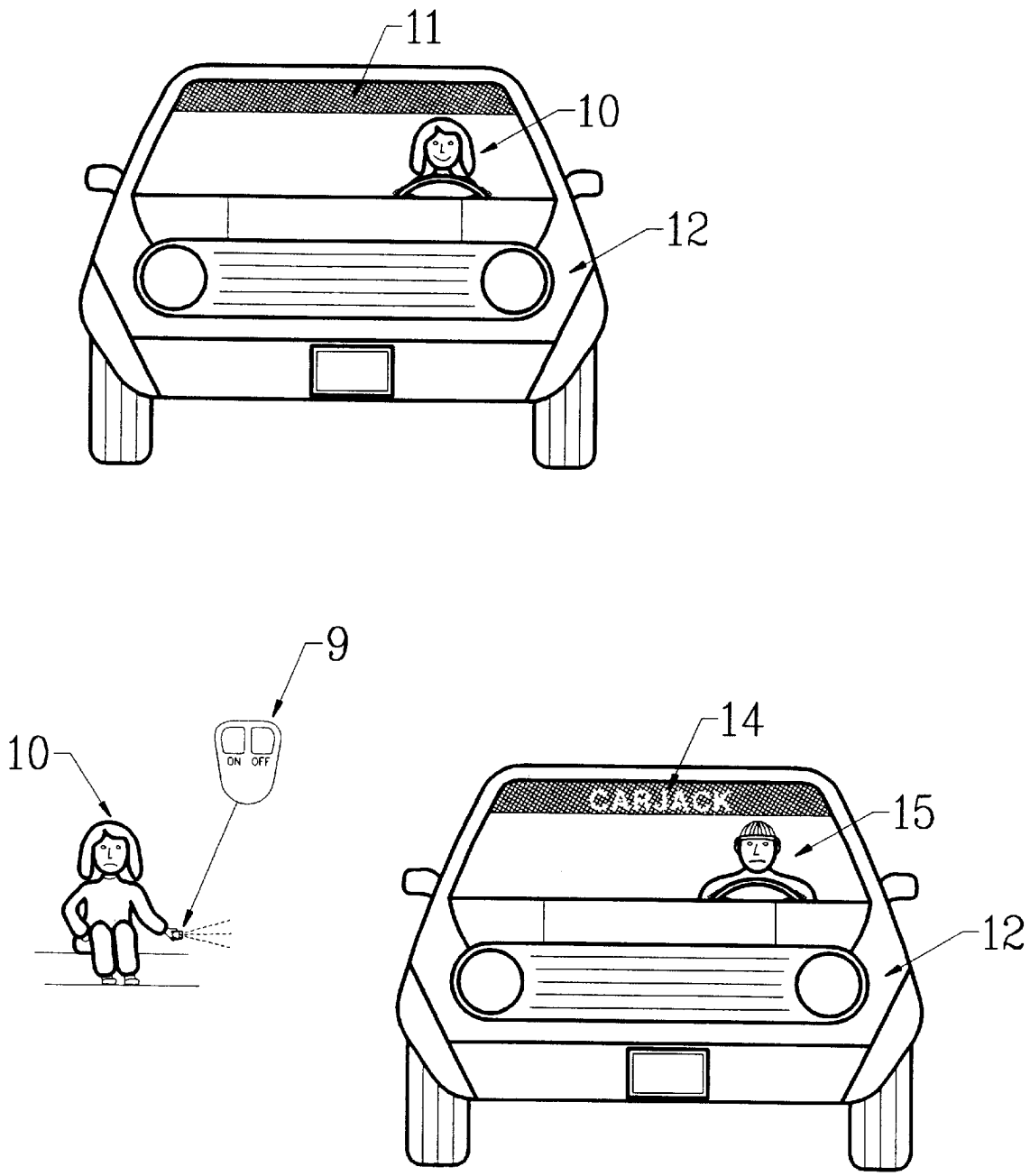
FIG. 7. Basically the same as {FIG. 6} only converted from stolen to carjack and displays the use of the remote control when "CARJACKED".
Figure 8:
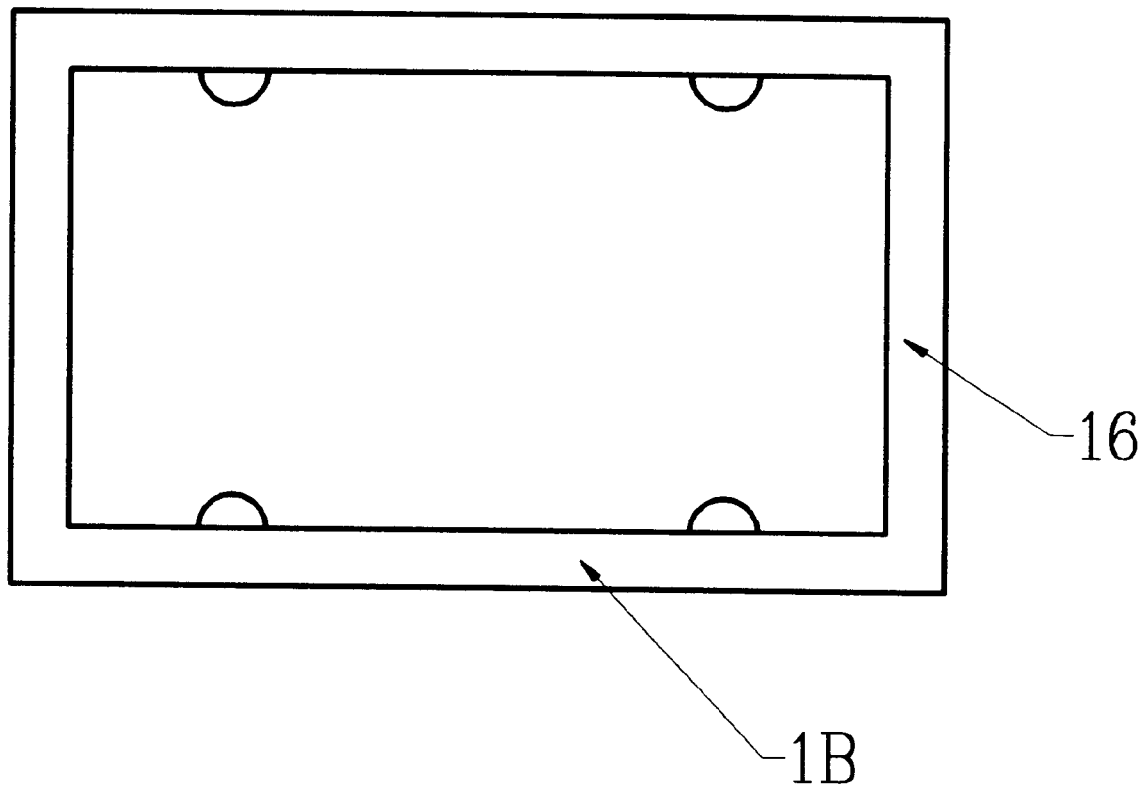
FIG. 8. Displays built in frame device for automobile theft.
Figure 9:
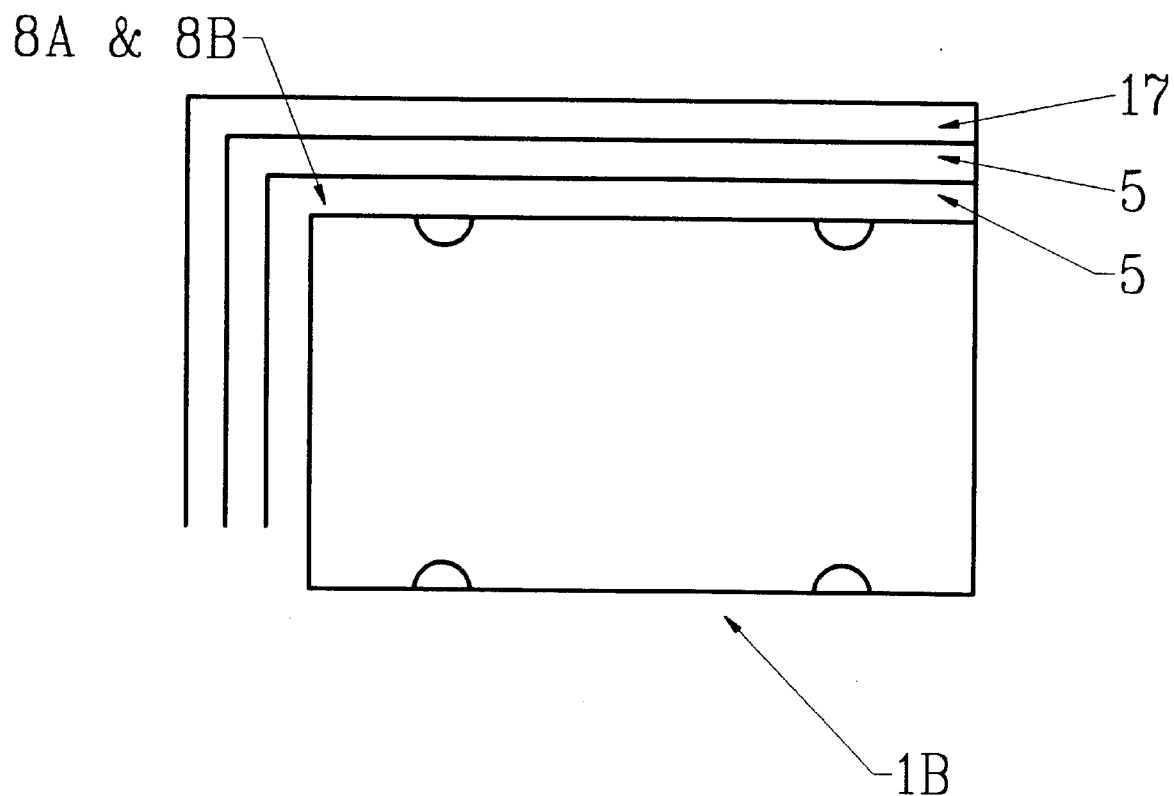
FIG. 9. Displays the device inside of frame 4,5,8B,17 and 18.
Figure 10:
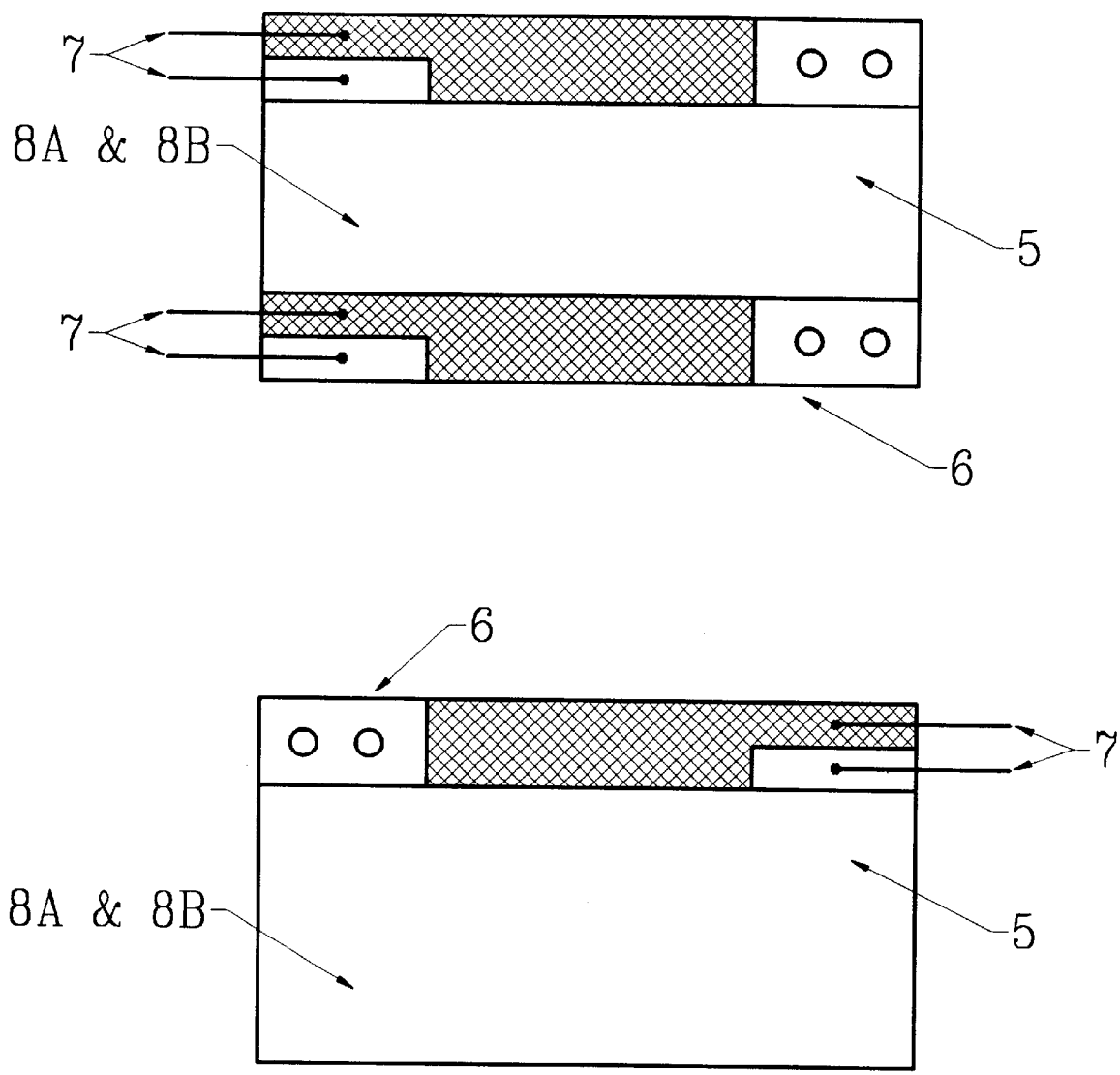
FIG. 10. Shows illuminated film with lumilux inside of film and 3m's privacy film with magnetic field along with wires connected.
Figure 11:
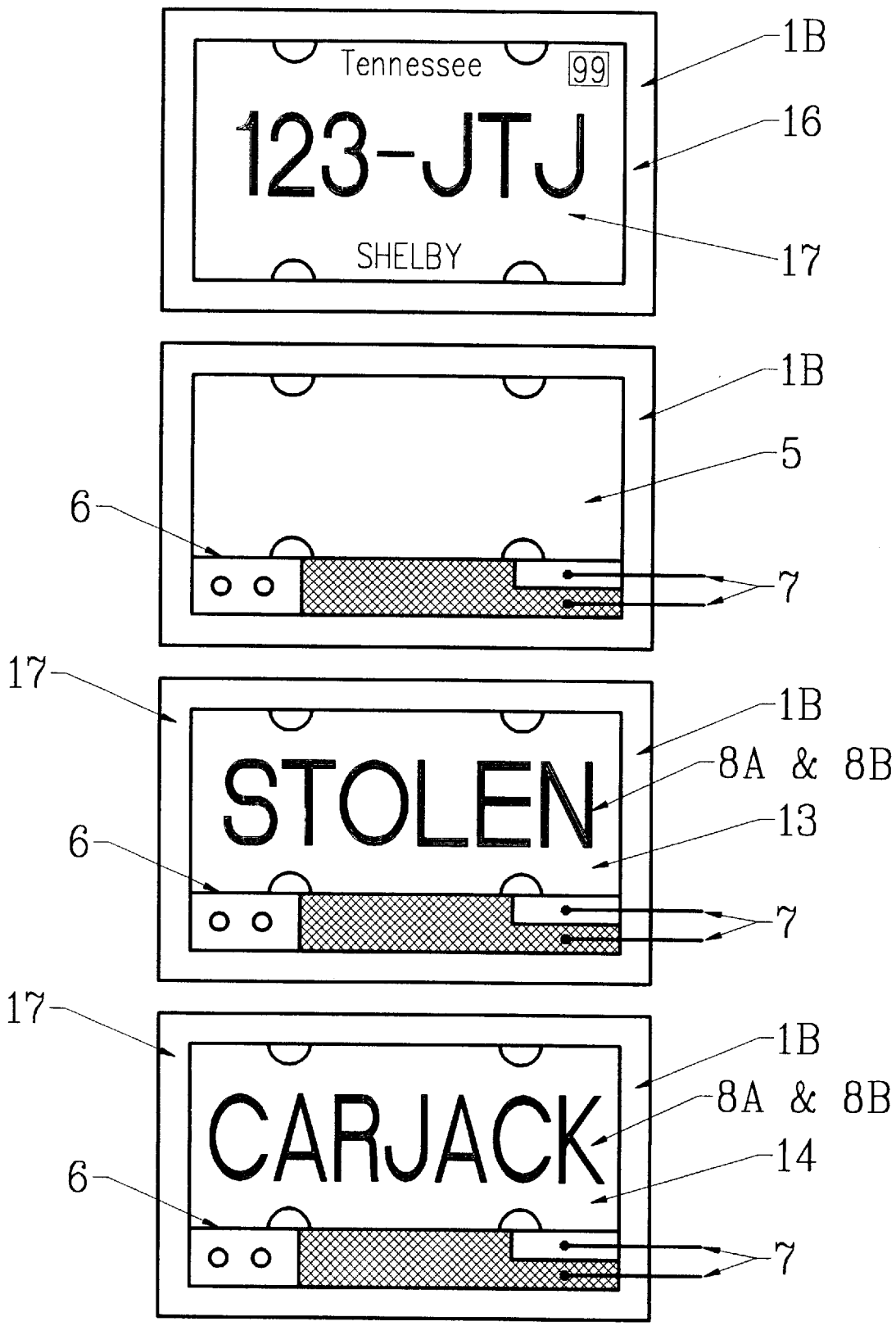
FIG. 11. Displays built in frame with each device 1B,4, 5,6,7,8B, 13,14,16,17 and 18.
Figure 12:
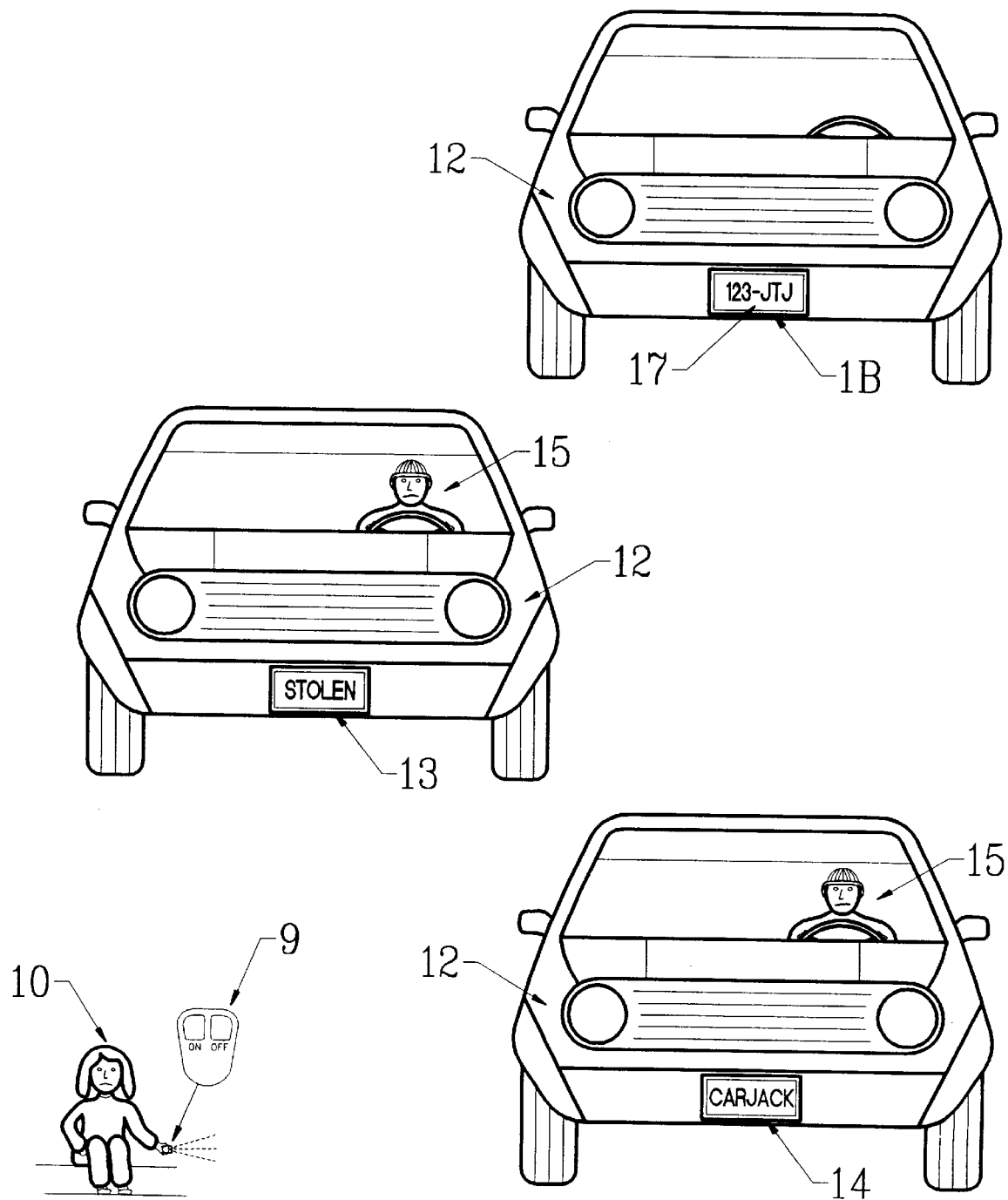
FIG. 12. Shows front of automobile before and after theft with remote control in the act of being carjacked.
Figure 13:
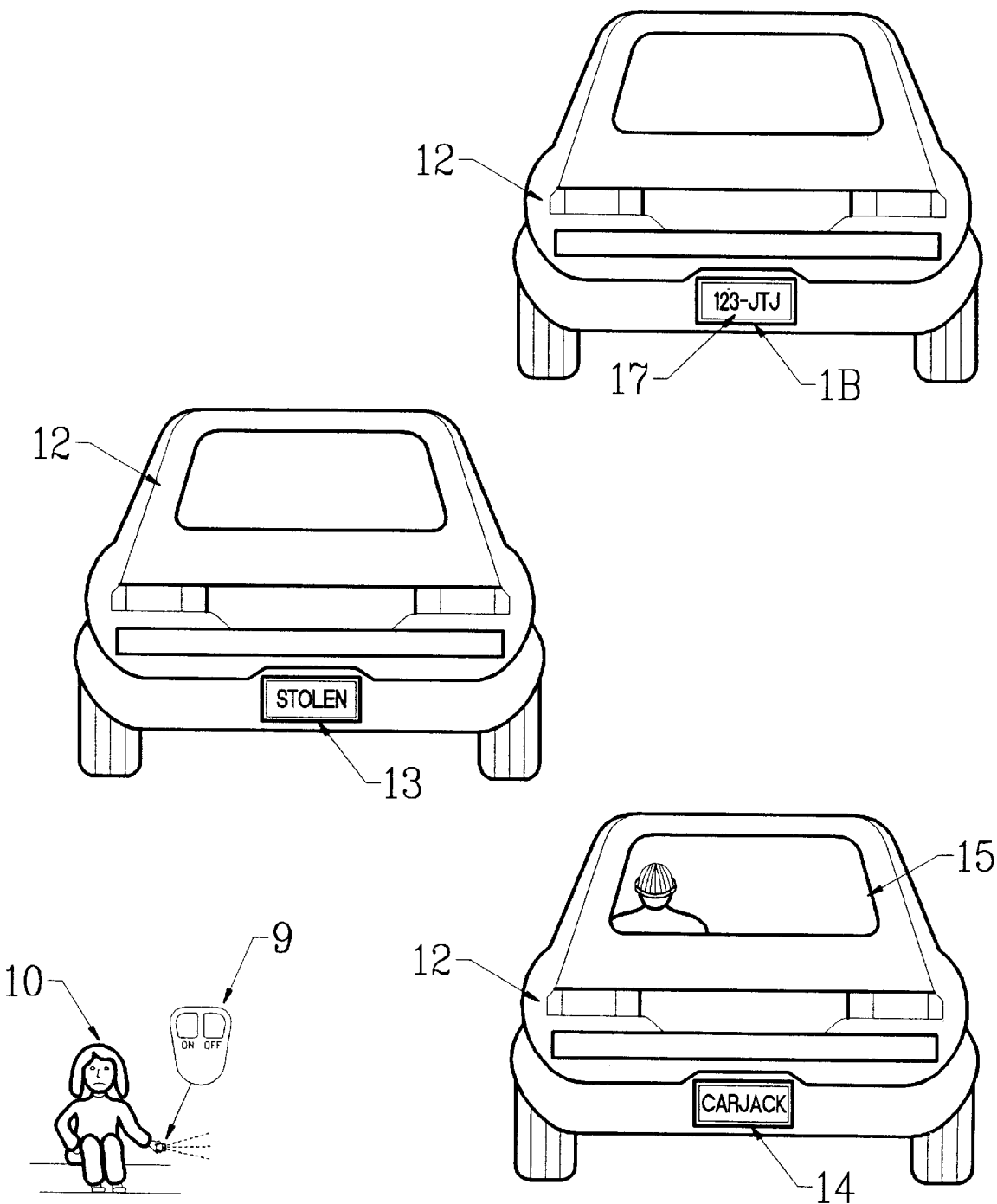
FIG. 13. Displays the same as {FIG. 12} accept the device is located in the rear of automobile.

FIG. 1. Displays automobile windshield glass for Anti-Theft Device 1A to go between inner layer 2 and outer layer 3. There will be the same thickness in the automobile glass with this device 1A added. FIG. 2. Shows illuminated film 4 along with 3m's privacy film 5 to be placed between the glass. FIG. 3. Displays 3m's privacy film 5 showing magnetic field 6 to be used to illuminate 3m's privacy film 5 or when not activated to be use as a second hand tint to prevent LSI 8A from showing when not activated. With connecting wires 7 to be connected anywhere on automobile. For example, fuel box, starter and ignition switch or brainbox. LSI 8A, lumilux 1B illuminated the words "STOLEN or CARJACK" to be shown inside windshield 1A or license plate frame 1B. FIG. 4. Displays windshield glass 2,3, illuminated film 4, 3m's privacy films and shows magnetic field 6 along with connection wires 7 and LSI 8A. To be joined as one device 1A inside and wiring connection 6 to be hanging out between the glass a couple inches. FIG. 5. Displays the wireless remote control 9 and the victim 10 using the remote while carjacking is taking place, showing in display {FIG. 6,7, 12 and 13}. FIG. 6. Displays the victim 10 driving along 12 with the device 11 installed in windshield 1A not activated. Also displays automobile 12 and thief 15 with the device 1A displaying the word "STOLEN" 13 outside the windshield 1A, with the thief 15 driving away 12. FIG. 7. Basically the same as {FIG. 6} except the thief 15 carjacked the victim 9 and the victim 9 presses the remote control 10 button on, and the word "CARJACK" 14 is illuminated on the windshield 1A, it will be helpful in warning pedestrians, and other vehicles and proper authorities. FIG. 8. Displays device 1B built into automobile when being manufactured and also shows inside device 16. FIG. 9. Displays the inside frame 16, starting at the end a place for the license plate 18, located in the middle of frame clear plastic 17, illuminated film 4 and lumilux 8B. FIG. 10 Displays the two films, illuminated film 4 with lumilux 8B and 3m's privacy film 5 with magnetic field 6 and connection wires 7. FIG. 11. Displays license plate 18 with frame 1B, stolen 13 with frame 1B, carjack 14 with frame 1B and 3m's privacy film 5 with frame 1B. FIG. 12. Displays the front of automobile with the device frame 1B, frame with designed plate 19 and thief 15 driving a stolen 13 car, the victim 10 activates remote control 9 because of carjacked 14, thief 15 driving away. FIG. 13. Basically the same as {FIG. 12} except this device is located in the rear of an automobile.

I claim:

1. A theft device that is visual and can be seen when illuminated on the front windshield glass, comprising:

an illuminate film operated by a two or four wire connection to a computer, fuel link and starting system of an automobile;

the illuminate film is installed between a windshield glass and the wire connection hangs out when the automobile glass is manufactured;

the illuminate film will illuminate the word "STOLEN" in the front windshield glass when activated by forced entry; and this device also operates with a wireless remote control unit to illuminate the word "CARJACK" in the front windshield glass.

* * * * *